US010458825B2

(12) United States Patent
Ozaki et al.

(10) Patent No.: US 10,458,825 B2
(45) Date of Patent: Oct. 29, 2019

(54) THERMAL FLOW-RATE SENSOR

(71) Applicant: DENSO CORPORATION, Kariya, Aichi-pref. (JP)

(72) Inventors: Yukikatsu Ozaki, Nishio (JP); Hirohito Matsui, Nishio (JP); Toshikazu Harada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 121 days.

(21) Appl. No.: 15/554,112

(22) PCT Filed: Feb. 8, 2016

(86) PCT No.: PCT/JP2016/053667
§ 371 (c)(1),
(2) Date: Aug. 28, 2017

(87) PCT Pub. No.: WO2016/140019
PCT Pub. Date: Sep. 9, 2016

(65) Prior Publication Data
US 2018/0038722 A1 Feb. 8, 2018

(30) Foreign Application Priority Data
Mar. 2, 2015 (JP) .................. 2015-040555

(51) Int. Cl.
*G01F 1/684* (2006.01)
*G01F 1/688* (2006.01)

(52) U.S. Cl.
CPC .............. *G01F 1/684* (2013.01); *G01F 1/688* (2013.01); *G01F 1/6847* (2013.01)

(58) Field of Classification Search
CPC ......... G01F 1/684; G01F 1/6847; G01F 1/688
(Continued)

(56) References Cited

U.S. PATENT DOCUMENTS 5,423,211 A * 6/1995 Senock ..................... G01F 1/68
73/204.22
6,439,765 B2 * 8/2002 Smith ..................... G01G 3/13
374/31
(Continued)

FOREIGN PATENT DOCUMENTS

JP H061185 A 1/1994
JP 2004069667 A 3/2004
(Continued)

OTHER PUBLICATIONS

JP-2013205310-A (Year: 2013).*

*Primary Examiner* — Natalie Huls
*Assistant Examiner* — Monica S Young
(74) *Attorney, Agent, or Firm* — Harness, Dickey & Pierce, P.L.C.

(57) ABSTRACT

A thermal flow-rate sensor includes: a first temperature sensor that detects the temperature at a specified location of the outer-wall surface of a pipe; a heat-transfer element that is arranged on the outer-wall surface of the pipe in a state separated from the first temperature sensor, and that exchanges heat with a measurement medium by heating or cooling the outer-wall surface of the pipe; a second temperature sensor that detects the temperature of a portion of the outer-wall surface of the pipe that is heated or cooled by the heat-transfer element; and a control unit that performs specified processing. A heat-flux sensor is arranged between the heat-transfer element and the outer-wall surface of the pipe and directly detects heat flux between the heat-transfer element and the pipe; and the control unit detects the flow rate of the measurement medium based on the temperature that is directly detected by the first temperature sensor, the temperature that is detected by the second temperature
(Continued)

sensor, and the heat flux that is detected by the heat-flux sensor.

6 Claims, 12 Drawing Sheets

(58) Field of Classification Search
USPC .......................................................... 73/204
See application file for complete search history.

(56) References Cited

U.S. PATENT DOCUMENTS

| | | | |
|---|---|---|---|
| 6,595,049 B1* | 7/2003 | Maginnis, Jr. ........ | G01F 1/6847 |
| | | | 73/202.5 |
| 9,659,416 B2* | 5/2017 | Tanaka .................. | B60R 16/023 |
| 2019/0049278 A1* | 2/2019 | Yamazaki ............... | G01F 1/698 |

FOREIGN PATENT DOCUMENTS

| | | | |
|---|---|---|---|
| JP | 2012181090 A | | 9/2012 |
| JP | 2013205310 A | * | 10/2013 |

\* cited by examiner

THERMAL FLOW-RATE SENSOR

CROSS REFERENCE TO RELATED APPLICATIONS

This application is a U.S. National Phase Application under 35 U.S.C. 371 of International Application No. PCT/JP2016/053667 filed on Feb. 8, 2016 and published in Japanese as WO 2016/140019 A1 on Sep. 9, 2016. This application is based on and claims the benefit of priority from Japanese Patent Application No. 2015-040555 filed on Mar. 2, 2015. The entire disclosures of all of the above applications are incorporated herein by reference.

TECHNICAL FIELD

The present invention relates to a thermal flow-rate sensor that detects a flow rate of a measurement medium that flows inside a pipe.

BACKGROUND ART

As a conventional thermal flow-rate sensor, there is a flow-rate sensor such as described in Patent Document 1, for example. In other words, this thermal flow-rate sensor includes a first temperature sensor, a heat-transfer element, and a second temperature sensor. The first temperature sensor detects the temperature of a measurement medium that flows inside a pipe by detecting the temperature of the pipe. Moreover, the heat-transfer element is arranged further on the downstream side in the direction of flow of the measurement medium than the first temperature sensor, and exchanges heat with the measurement medium (pipe). The second temperature sensor detects the temperature of the outside air. So as not to be affected by the temperature of a portion that exchanges heat with the heat-transfer element inside the pipe, the first temperature sensor is arranged so as to be sufficiently separated from the heat-transfer element.

In this kind of thermal flow-rate sensor, the temperature of the outside air is detected by the second temperature sensor, and the heat flux between the heat-transfer element and the pipe is calculated based on the temperature of the outside air.

PRIOR ART LITERATURE

Patent Literature

[Patent Document 1]
Japanese Patent Application Publication No. 2004-69667

SUMMARY OF THE INVENTION

Problems to be Solve by the Invention

However, in the thermal flow-rate sensor according to Patent Document 1, the temperature of the outside air is detected, and the heat flux between the heat-transfer element and the pipe is calculated (in other words, estimated) based on the temperature of the outside air, so there is a problem in that it is easy for detection precision to decrease.

In consideration of the point above, the object of the present invention is to provide a thermal flow-rate sensor that is able to suppress a detection precision from dropping.

Means for Solving the Problems

One form of the thermal flow-rate sensor of the present invention includes: a first temperature sensor that detects the temperature of a measurement medium that is flowing through a passageway inside a pipe by detecting the temperature at a specified location of an outer-wall surface of the pipe; a heat-transfer element that is arranged on the outer-wall surface of the pipe in a state separated from the first temperature sensor, and that exchanges heat with the measurement medium by heating or cooling the outer-wall surface of the pipe; a second temperature sensor that detects the temperature of a portion of the outer-wall surface of the pipe that is heated or cooled by the heat-transfer element; and a control unit that performs specified processing.

A heat-flux sensor is arranged between the heat-transfer element and the outer-wall surface of the pipe and detects heat flux between the heat-transfer element and the pipe; and the control unit detects the flow rate of the measurement medium based on the temperature that is detected by the first temperature sensor, the temperature that is detected by the second temperature sensor, and the heat flux that is detected by the heat-flux sensor.

According to this, the heat-flux sensor is arranged between the heat-transfer element and the outer-wall surface of the pipe, and the heat-flux directly detects heat flux between the heat-transfer element and the pipe. Therefore, it is possible to suppress the detection precision from dropping for detecting heat flux, and to suppress the detection precision from dropping for detecting the flow rate of the measurement medium.

EMBODIMENTS FOR CARRYING OUT THE INVENTION

In the following, embodiments of the present invention will be explained based on the drawings. The following embodiments will be explained by assigning the same reference numbers to portions that are the same or equivalent.

First Embodiment

Figure 1:
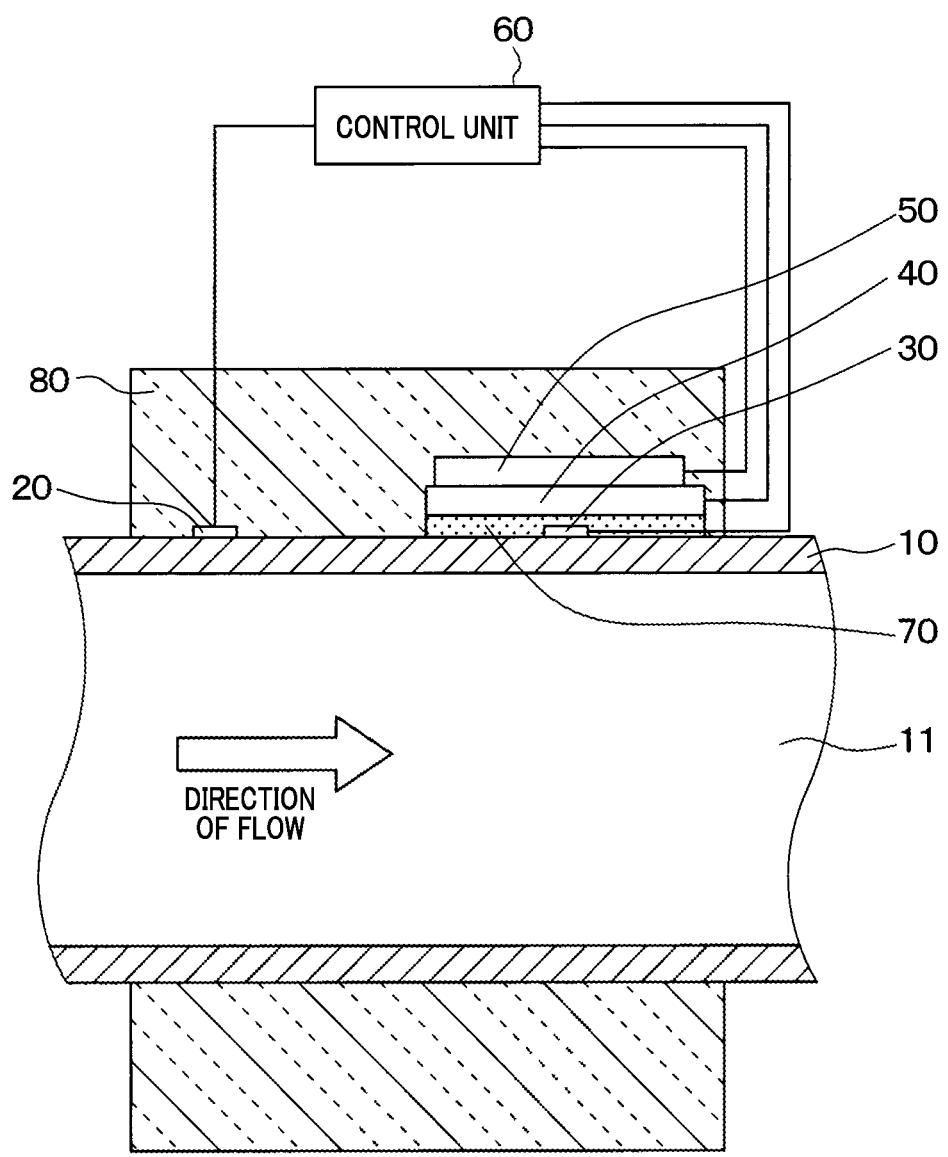
FIG. 1 is a schematic diagram illustrating an arrangement configuration of a thermal flow-rate sensor of a first embodiment of the present invention.

A first embodiment of the present invention will be explained. A thermal flow-rate sensor of the present embodiment is a sensor that detects a flow rate of a measurement medium that flows inside a pipe 10; and as illustrated in FIG. 1, the thermal flow-rate sensory includes a first temperature sensor 20 and a second temperature sensor 30 that detect temperature, a heat-flux sensor 40 that detects heat flux, a heat-transfer element 50 that heats the pipe 10, and a control unit 60.

The pipe 10 is made of metal member such as SUS or the like, and has a passageway 11 inside of which a measurement medium flows. In the present embodiment, the direction of flow of the measurement medium that flows inside the pipe 10 will be explained as being from the left side to the right side of the drawing surface.

The first temperature sensor 20 and second temperature sensor 30 include a thermistor or the like, and are arranged on an outer-wall surface of the pipe 10 so as to be separated from each other. In the present embodiment, the first temperature sensor 20 is arranged further on the upstream side (left side of the surface in FIG. 1) in the direction of flow of the measurement medium than the second temperature sensor 30. Moreover, the first temperature sensor 20 and the second temperature sensor 30 are connected to the control unit 60, and each sensor outputs a detection signal according to the temperature of the outer-wall surface of the pipe 10 where the sensor is arranged.

As will be described in detail later, the first temperature sensor 20 detects the temperature of a portion of the outer-wall surface of the pipe 10 that is not heated by the heat-transfer element 50, and the second temperature sensor 30 detects the temperature of a portion of the outer-wall surface of the pipe 10 that is heated by the heat-transfer element 50. In other words, the first temperature sensor 20 is arranged further on the upstream side in the direction of flow of the measurement medium than the second temperature sensor 30 is, and is arranged so as to be sufficiently separated from the second temperature sensor 30 (heat-transfer element 50).

The heat-flux sensor 40 is arranged on the second temperature sensor 30 and is connected to the control unit 60. As will be described in detail later, the heat-transfer element 50 is arranged on the heat-flux sensor 40, and outputs a detection signal according to the heat flux between the heat-transfer element 50 and the pipe 10 to the control unit 60. Here, the configuration of the heat-flux sensor 40 of the present embodiment will be explained in detail.

Figure 2:
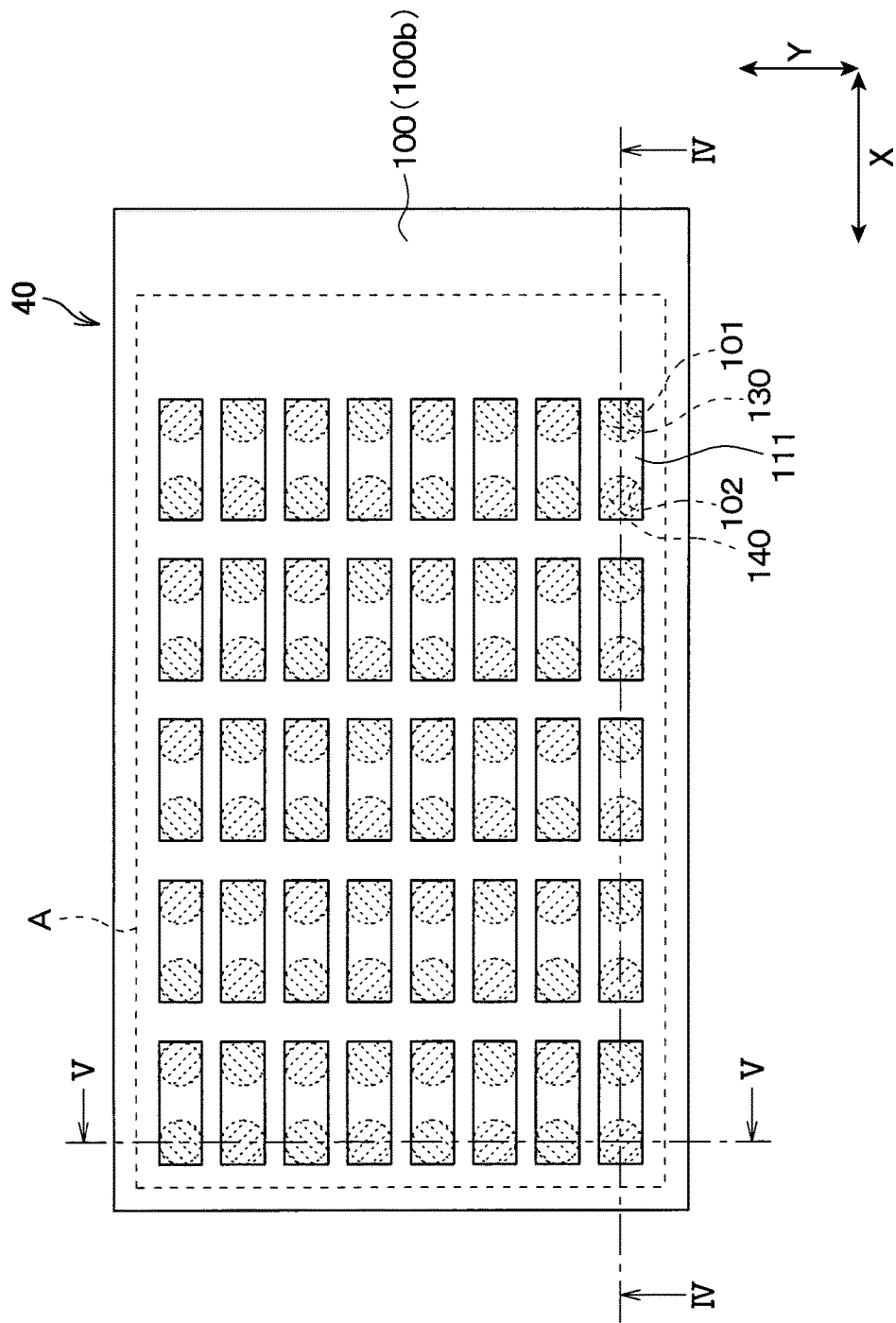
FIG. 2 is a plan view of a heat-flux sensor illustrated in FIG. 1 as seen from a rear-surface-protective-member side.
Figure 3:
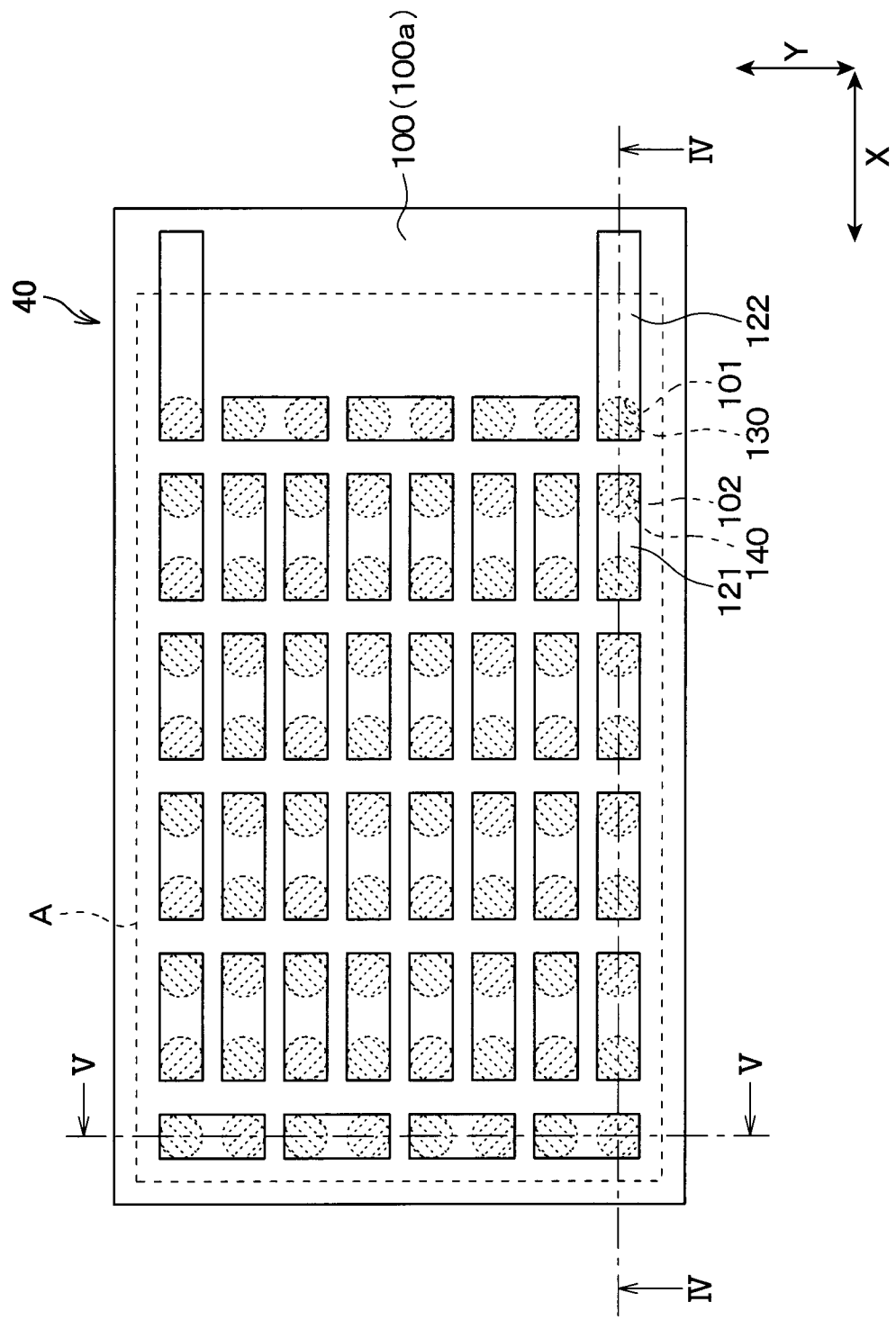
FIG. 3 is a plan view of the heat-flux sensor illustrated in FIG. 1 as seen from a front-surface-protective-member side.

The heat-flux sensor 40, as illustrated in FIG. 2 to FIG. 5, is configured such that an insulating substrate 100, a rear-surface-protective member 110, and a front-surface-protective member 120 are integrated into a single body, and inside this integrated body, first and second interlayer-connecting members 130, 140 are connected together in series in the present embodiment. In FIG. 2, for easy understanding, the rear-surface-protective member 110 is omitted. Moreover, in FIG. 3, for easy understanding, the front-surface-protective member 120 is omitted. FIG. 2 and FIG. 3 are not cross-sectional views, however, the first and second interlayer-connecting members 130, 140 are illustrated with hatching.

The insulating substrate 100 includes a planar rectangular shaped thermoplastic resin film that is represented by polyetheretherketone (PEEK), polyetherimide (PEI), and liquid-crystal polymer (LCP) in the present embodiment. A plurality of first and second via holes 101, 102 that penetrate in the thickness direction Z are formed in a zigzag pattern so as to be staggered.

The first and second via holes 101, 102 are formed into a cylindrical shape with a fixed diameter from the front surface 100a to the rear surface 100b of the insulating substrate 100 (refer to FIG. 4 and FIG. 5), however, the first and second via holes 101, 102 may also be formed in a taper shape of which the diameter becomes smaller going from the front surface 100a toward the rear surface 100b. Moreover, the first and second via holes 101, 102 may also be formed in a taper shape of which the diameter becomes smaller going from the rear surface 100b toward the front surface 100a.

The first interlayer-connecting members 130 are arranged in the first via holes 101, and the second interlayer-connecting members 140 are arranged in the second via holes 102. In other words, the first and second interlayer-connecting members 130, 140 are arranged in the insulating substrate 100 so as to be staggered with respect to each other.

The first and second interlayer-connecting members 130, 140 are made of metals that are different from each other in order to obtain a Seebeck effect. For example, the first interlayer-connecting members 130 are made of a solid-phase sintered metal compound (sintered alloy) so that P-type Bi—Sb—Te alloy powder maintains the crystal structure of a plurality of metal atoms before sintering. The second interlayer-connecting members 140 are made of a solid-phase sintered metal compound (sintered alloy) so that N-type Bi—Te alloy powder maintains a specified crystal structure of a plurality of metal atoms before sintering. In this way, by using solid-phase sintered metal compounds as the first and second interlayer-connecting members 130, 140 so that specified crystal structures are maintained, it is possible to increase the induced voltage.

The rear-surface-protective member 110 is arranged on the rear surface 100b of the insulating substrate 100. The rear-surface-protective member 110 includes, for example, a planar rectangular shaped thermoplastic resin film that is represented by polyetheretherketone (PEEK), polyetherimide (PEI), and liquid-crystal polymer (LCP). This rear-surface-protective member 110 is such that the dimensions of the planar shape are the same as those of the insulating substrate 100, and copper foil or the like that is patterned with a plurality of rear-surface patterns 111 that are separated from each other is formed on the one surface 110a side that faces the insulating substrate 100. Each rear-surface pattern 111 is suitably and electrically connected to both the first and second interlayer-connecting members 130, 140.

Figure 4:
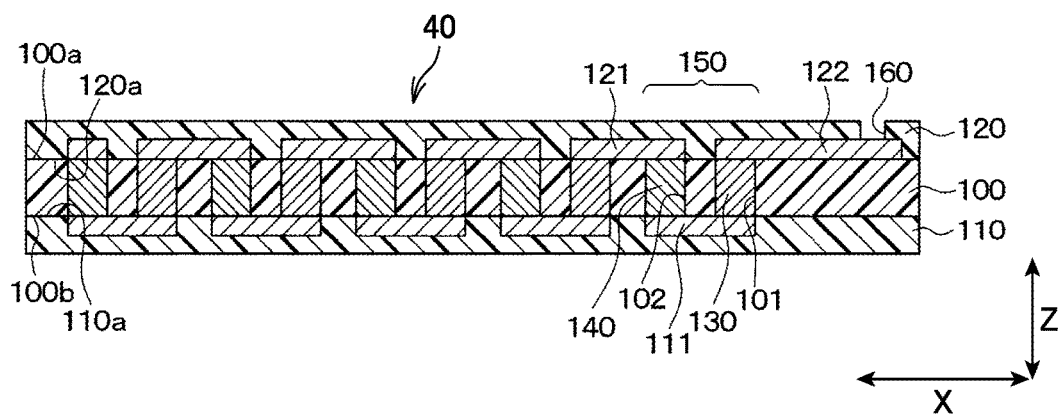
FIG. 4 is a cross-sectional view taken along a section line IV-IV in FIG. 2 and FIG. 3.

More specifically, as illustrated in FIG. 2 and FIG. 4, when adjoining one interlayer-connecting member 130 and one interlayer-connecting member 140 to form one set 150, each set 150 of the first and second interlayer-connecting members 130, 140 is connected to the same rear-surface pattern 111. In other words, each set 150 of the first and second interlayer-connecting members 130, 140 is electrically connected via a rear-surface pattern 111. In the present embodiment, one first interlayer-connecting member 130 and one second interlayer-connecting member 140 that are adjacent in the lengthwise direction X of the insulating substrate 100 form one set 150.

A front-surface-protective member 120 is arranged on the front surface 100a of the insulating substrate 100. The front-surface-protective member 120 includes, for example, a planar rectangular shaped thermoplastic resin film that is represented by polyetheretherketone (PEEK), polyetherimide (PEI), and liquid-crystal polymer (LCP). This front-surface-protective member 120, as in the case of the rear-surface-protective member 110, is such that the dimensions of the planar shape are the same as those of the insulating substrate 100, and copper foil or the like that is patterned with a plurality of rear-surface patterns 121 and two connecting patterns 122 that are separated from each other is formed on the one surface 120a side that faces the insulating substrate 100. The rear-surface patterns 121 and two connecting patterns 122 are suitably and electrically connected to both the first and second interlayer-connecting members 130, 140.

More specifically, as illustrated in FIG. 3 and FIG. 4, in the sets 150 that are adjacent in the lengthwise direction X of the insulating substrate 100, the first interlayer-connecting member 130 of one set 150 and the second interlayer-connecting member of the other set 150 are connected to the same front-surface pattern 121. In other words, the first and second interlayer-connecting members 130, 140 are electrically connected via a front surface pattern 121 across the sets 150.

Figure 5:
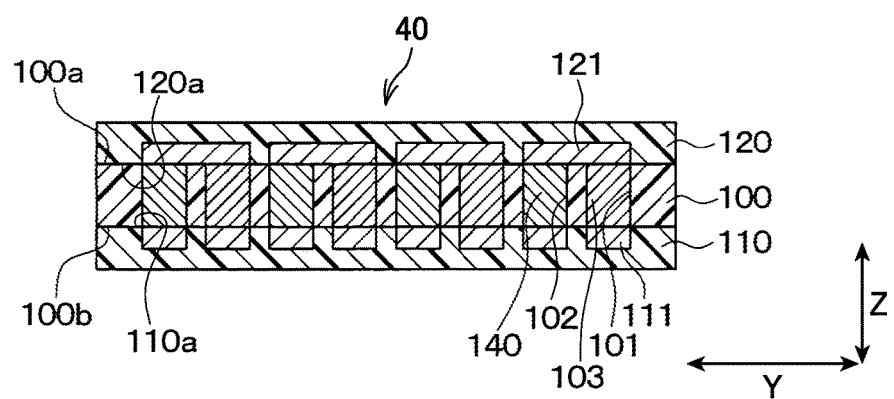
FIG. 5 is a cross-sectional view taken along a section line V-V in FIG. 2 and FIG. 3.

Moreover, as illustrated in FIG. 3 and FIG. 5, on the outer edge of the insulating substrate 100, the first and second interlayer-connecting members 130, 140, that are adjacent along the direction Y that is orthogonal to the lengthwise direction X, are connected to the same front-surface pattern 121. As will be described in detail later, the adjacent first and second interlayer-connecting members 130, 140 are connected to the same front-surface pattern 121 so that the first and second interlayer-connecting members 130, 140 that are connected in series via the front-surface pattern 121 and the rear-surface patter 111 in the lengthwise direction of the insulating substrate 100 are folded back.

Furthermore, as illustrated in FIG. 3 and FIG. 4, the first and second interlayer-connecting members 130, 140, end sections of which are connected in series as described above (the first interlayer-connecting member 130 on the lower right of the drawing surface in FIG. 3, and the second interlayer-connecting member 140 on the upper right of the drawing surface in FIG. 3) are connected to a connecting pattern 122. As will be described in detail later, the heat-transfer element 50 is arranged on the heat-flux sensor 40, and in FIG. 3, a portion that faces the heat-transfer element 50 (a portion positioned directly below) is illustrated as an area A. The two connecting patterns 122 are such that the end sections that are on the opposite side from the side that is connected to the respective first and second interlayer-connecting members 130, 140 are extended to the outside of the area A. In FIG. 2 as well, a portion that faces the heat-transfer element 50 (a portion positioned directly below) is illustrated as the area A.

As illustrated in FIG. 4, connecting holes 160 are formed in the front-surface-protective member 120 so that end sections of the connecting patterns 122 that extend to the outside of the area A are exposed. The heat-flux sensor 40 can be electrically connected to the control unit 60 via the connecting holes 160.

The configuration of the heat-flux sensor 40 of the present embodiment is as described above. The heat-flux sensor 40 described above is such that when the heat flux that is passing through the heat-flux sensor 40 in the thickness direction Z changes, the induced voltage that occurs in the first and second interlayer-connecting members 130, 140 that are connected in series with each other changes, so that induced voltage is outputted to the control unit 60 as a detection signal. The thickness direction Z of the heat-flux sensor 40 is the layering direction of the insulating substrate 100, the front-surface-protective member 120, and the rear-surface-protective member 110.

It is not particularly illustrated in the figures, however, this kind of heat-flux sensor 40 is manufactured by a so-called PALAP (registered trademark) manufacturing method. In other words, first, the first and second via holes 101, 102 are formed in the insulating substrate 100, and conductive paste of the first and second interlayer-connecting members 130, 140 is filled into the first and second via holes 101, 102. Next, the rear-surface-protective member 110 in which rear-surface patterns 111 are formed, and the front-surface-protective member 120 in which front-surface patterns 121 and connecting patterns 122 are formed are prepared. Then, a laminate is formed by layering the rear-surface-protective member 110, the insulating substrate 100, and the front-surface-protective member 120 in this order so that the conductive paste that is filled in the first and second via holes 101, 102 comes in suitable contact with the front-surface patterns 121 and the rear-surface patterns 111. After that, the heat-flux sensor 40 is manufactured by applying pressure to the rear-surface-protective member 110, the insulating substrate 100, and the front-surface-protective member 120 in the layering direction (thickness direction Z) while heating the laminate in order to form a single body, forming the first and second interlayer-connecting members 130, 140 from the conductive paste.

Then, as illustrated in FIG. 1, the heat-flux sensor 40 described above is arranged on the second temperature sensor 30 (the outer wall surface of the pipe 10) via a heat-conducting member 70 that is arranged so as to cover the second temperature sensor 30. More specifically, the heat-conducting member 70 is a heat-conducting member such as grease, gel sheet or the like that has flexibility, and is being arranged along the outer-wall surface of the pipe 10, and a side opposite from the pipe 10 has a shape (surface) that runs along the pipe 10. The heat-flux sensor 40 is arranged via the heat-conducting member 70 so that the rear-surface-protective member 110 side is the heat-conducting member 70 side, and so that there is no gap (space) between the heat-flux sensor 40 and the heat-conducting member 70. In other words, the heat-conducting member 70 is arranged so that between the heat-flux sensor 40 and outer-wall surface of the pipe 10 (second temperature sensor 30) is completely sealed.

The heat-flux sensor 40 has flexibility because the insulating substrate 100, front-surface-protective member 120, and rear-surface-protective member 110 are configured of a thermoplastic resin. Therefore, the heat-flux sensor 40 is arranged in a shape along the heat-conducting member 70 (foundation).

The heat-transfer element 50, in the present embodiment, includes an electric heater that heats by electrical conduction, and is arranged on the heat-flux sensor 40. In other words, the heat-transfer element 50 is arranged on the outer-wall surface of the pipe 10 so that the heat-flux sensor 40 is arranged between the heat-transfer element 50 and the outer-wall surface of the pipe 10. The heat-transfer element 50 performs heat exchange with the measurement medium by heating a portion of the outer-wall surface of the pipe 10 that faces the heat-transfer element 50 via the heat-flux sensor 40, the heat-conducting member 70, the second temperature sensor 30, and areas around that portion. Therefore, the second temperature sensor 30 detects the temperature of a portion of the outer-wall surface of the pipe 10 that is heated by the heat-transfer element 50, and the heat-flux sensor 40 directly detects the heat flux between heat-transfer element 50 and the outer-wall surface of the pipe 10. The first temperature sensor 20 is arranged in a position that is sufficiently separated from the portion of the outer-wall surface of the pipe 10 that is heated by the heat-transfer element 50 as described above, and detects the temperature of the portion that is not heated by the heat-transfer element 50.

As illustrated in FIG. 1 to FIG. 3, in the present embodiment, the heat-transfer element 50 has a rectangular shape of which the planar shape dimensions are smaller than those of the heat-flux sensor 40. When viewed from the layering direction of the heat-transfer element 50 and the heat-flux sensor 40, the heat-transfer element 50 is arranged so as to be positioned inside the heat-flux sensor 40 (the area A in FIG. 2 and FIG. 3). In other words, as seen from the layering direction, the end sections that form the outer shape of the heat-transfer element 50 are arranged so as not to protrude from the heat-flux sensor 40.

A heat-insulating member 80 that includes glass wool, foamed urethane, or the like is arranged so as to cover the first temperature sensor 20 and second temperature sensor 30, the heat-flux sensor 40, the heat-transfer element 50, and the heat-conducting member 70. In the present embodiment, as the heat-insulating member 80, a ring-shaped member is illustrated that covers the first temperature sensor 20 and second temperature sensor 30, the heat-flux sensor 40, the heat-transfer element 50 and the heat-conducting member 70, however, a member may be used that covers only specified locations of the pipe 10 where the first temperature sensor 20 and second temperature sensor 30, the heat-flux sensor 40, the heat-transfer element 50 and the heat-conducting member 70 are arranged.

The control unit 60 is configured of a CPU, various memories of storage means, peripheral devices and the like. The control unit 60 detects the flow rate of a measurement medium that flows inside the passage 11 of the pipe 10 by performing specified processing. More specifically, when detections signals detected by the first temperature sensor 20, the second temperature sensor 30, and the heat-flux sensor 40 are inputted, the control unit 60 uses these detection signals to detect the flow rate of the measurement medium that flows inside the passageway 11 of the pipe 10. In the present embodiment, the control unit 60 corresponds to the control unit of the present invention.

The thermal flow-rate sensor of the present embodiment is configured as described above. Next, the operation of the thermal flow-rate sensor described above will be explained.

In the thermal flow-rate sensor such as described above, when the heat-transfer element 50 generates heat, the portion of the pipe 10 that faces the heat-transfer element 50 (portion positioned directly below) and the area near that portion are heated. Then, the heat that is generated in the heat-transfer element 50 is transferred to the pipe 10 via the heat-flux sensor 40 (heat flux passes through the heat-flux sensor 40). Therefore, a detection signal is outputted from the heat-flux sensor 40 to the control unit 60 according to the heat flux that passes trough the heat-flux sensor 40. In other words, the heat flux between the heat-flux sensor 40 and the outer-wall surface of the pipe 10 is directly detected by the heat-flux sensor 40. Moreover, a detection signal according to the temperature of the outer-wall surface of the pipe 10 that is not heated by the heat-transfer element 50 is outputted from the first-temperature sensor 20 to the control unit 60. Then a detection signal according to the temperature of the portion of the outer-wall surface of the pipe 10 that is heated by the heat-transfer element 50 is outputted from the second temperature sensor 30 to the control unit 60.

Here, when the heat flux that is detected by the heat-flux sensor 40 is taken to be Q, the heat-transfer coefficient from the pipe 10 to the measurement medium is taken to be h, the temperature of the measurement medium is taken to be T1, and the temperature of the wall surface that is heated by the heat-transfer element 50 is taken to be T2, the equation $Q=h(T2-T0)$ is established. The temperature of the portion of the outer-wall surface of the pipe 10 that is not heated by the heat-transfer element 50 can be presumed to be equal to the temperature of the measurement medium. In other words, the temperature T1 of the measurement medium is detected by the first temperature sensor 20.

Therefore, the control unit 60 first calculates the heat-transfer coefficient by using the detected heat flux Q, the temperature of the measurement medium T1, and the temperature of the heated portion of the wall surface T2. Moreover, the heat-transfer coefficient h and the flow velocity of the measurement medium have a correlation, so the flow velocity is calculated from the correlation between the calculated heat-transfer coefficient h and the flow velocity of the measurement medium. Then, by performing calculation (multiplication) based on the cross-sectional area of the pipe that is a specified value, and the flow velocity of the measurement medium, the flow rate of the measurement medium is calculated. The flow rate of the measurement medium is calculated as described above.

Here, in the present embodiment, the heat-transfer element 60 has a rectangular shape with the dimensions of the planar shape being smaller than those of the heat-flux sensor 40. Also, when viewed from the layering direction (thickness direction Z) of the heat-transfer element 50 and heat-flux sensor 40, the heat-transfer element 50 is positioned so as to be inside the heat-flux sensor 40. Therefore, the detection precision of the heat-flux sensor 40 is further prevented from decreasing.

In other words, when the dimensions of the planar shape of the heat-transfer element 50 are larger than those of the heat-flux sensor 40, and the end sections that form the outer shape of the heat-transfer element 50 protrude from the heat-flux sensor 40, the areas directly below the protruding portions become gaps (spaces). Therefore, by heat that is generated in protruding portions being transferred to the gaps, the temperature distribution of the heat-flux sensor 40 by the heat that is transferred to the gaps changes. As a result, there is a possibility that the detection precision of the heat-flux sensor 40 will drop due to the heat flux changing in each area.

However, in the present embodiment, the heat-transfer element 50 has a rectangular shape, and the dimensions of the planar shape of which are less than those of the heat-flux sensor 40. Also, when viewed from the layering direction (thickness direction Z) of the heat-transfer element 50 and the heat-flux sensor 40, the heat-transfer element 50 is arranged so as to be positioned inside the heat-flux sensor 40. Therefore, heat that is generated in the heat-transfer element 50 uniformly passes through the heat-flux sensor 40, so it is possible to suppress a the detection precision from dropping.

Similarly, the heat-conducting member 70 is arranged between the heat-flux sensor 40 and the pipe 10 so that no gaps (spaces) are formed. Therefore, heat that is generated in the heat-transfer element 50 is uniformly transmitted to the pipe 10 via the heat-flux sensor 40 and the heat-conducting member 70. As a result, it is possible to suppress the detection precision of the heat-flux sensor 40 from dropping. Moreover, the heat that is generated in the heat-transfer element 50 is uniformly transmitted to the pipe 10 via the heat-flux sensor 40 and the heat-conducting member 70. As a result, it is possible to prevent an error from occurring between the temperature of the heated portion of the outer-wall surface of the pipe 10 and the heat flux that passes through the heat-flux sensor 40.

As explained above, in the present embodiment, the heat-flux sensor 40 is arranged between the heat-transfer element 50 and the outer-wall surface of the pipe 10, and the heat-flux sensor 40 directly detects the heat flux between the heat-transfer element 50 and the pipe 10. Therefore, it is possible to suppress the detection precision for detecting the heat flux from dropping, and it is possible to suppress the detection precision for detecting the flow rate of the measurement medium from dropping.

Moreover, in the present embodiment, the heat-transfer element 50 has a rectangular shape with the dimensions of the planar shape being smaller than those of the heat-flux sensor 40. Moreover, when viewed from the layering direction (thickness direction Z) of the heat-transfer element 50 and the heat-flux sensor 40, the heat-transfer element 50 is arranged so as to be positioned inside the heat-flux sensor 40. Therefore, heat that is generated in the heat-transfer element 50 uniformly passes through the heat-flux sensor 40. As a result, when compared with a case in which the end sections that form the outer shape of the heat-transfer element 50 protrude from the heat-flux sensor 40, it is possible to suppress the detection precision of the heat-flux sensor 40 from dropping.

Second Embodiment

A second embodiment of the present invention will be explained. In the present embodiment, an arrangement location of a second temperature sensor 30 is changed from that of the first embodiment, however, the other parts are the same as those of the first embodiment, so an explanation of those parts will be omitted here.

Figure 6:
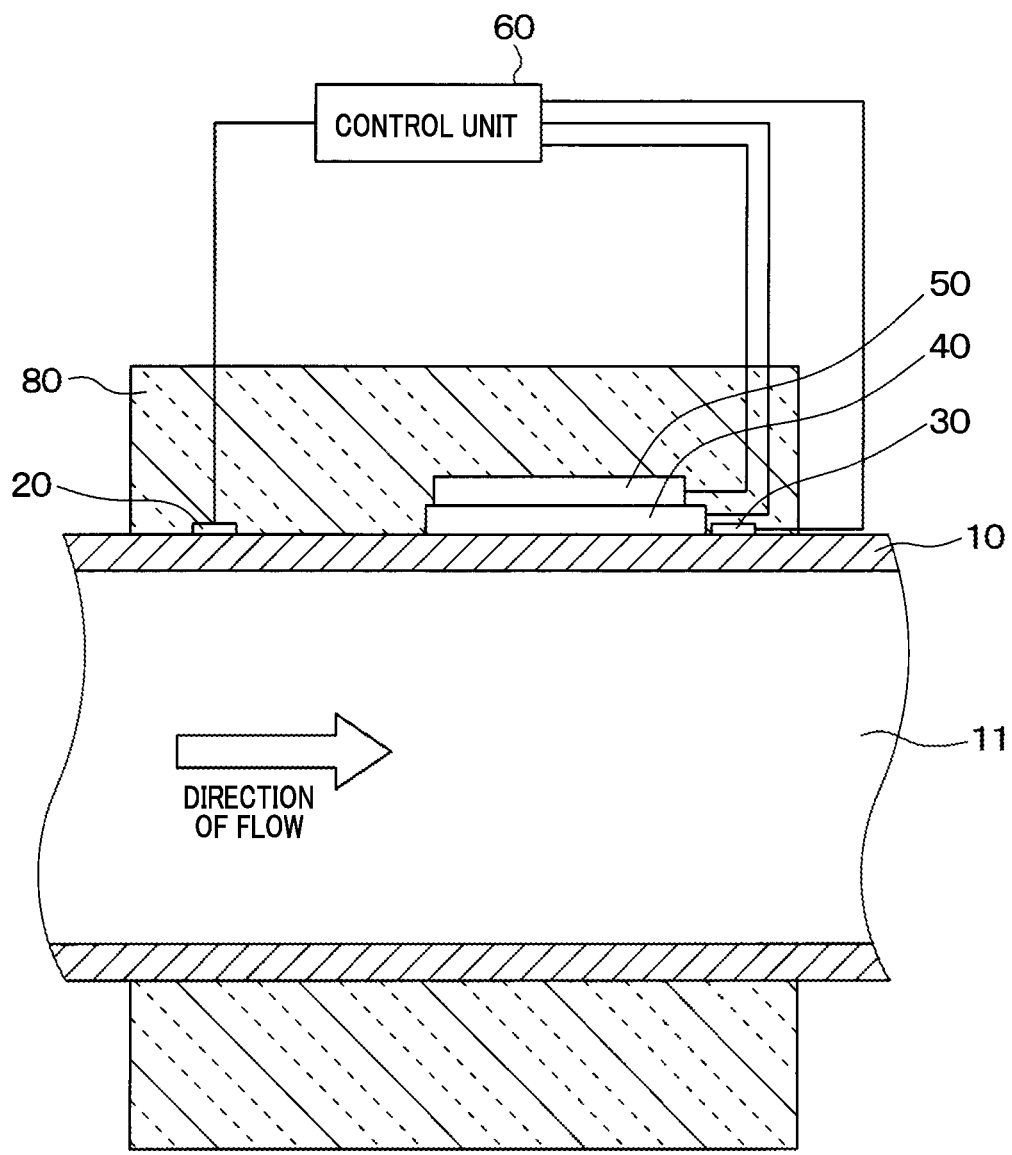
FIG. 6 is a schematic diagram illustrating an arrangement configuration of a thermal flow-rate sensor of a second embodiment of the present invention.

In the present embodiment, as illustrated in FIG. 6, the heat-flux sensor 40 is arranged directly on the outer-wall surface of the pipe 10. In other words, in the present embodiment, configuration is such that a heat-conducting member 70 is not arranged between the heat-flux sensor 40 and the pipe 10. The second temperature sensor 30 is arranged near the heat-flux sensor 40. More specifically, the second temperature sensor 30 is not arranged in a portion of the outer-wall surface of the pipe 10 that faces the heat-transfer element 50. However, the second temperature sensor 30 is arranged at a location where it is possible to detect the temperature of a portion of the outer-wall surface of the pipe 10 that is heated by the heat-transfer element 50.

In this way, as long as the second temperature sensor 30 is at a location where it is possible to detect the temperature of the portion of the outer-wall surface of the pipe 10 that is heated by the heat-transfer element 50, the second temperature sensor 30 does not need to be arranged at a portion of the outer-wall surface of the pipe 10 that faces the heat-transfer element 50. Moreover, when the second temperature sensor 30 is arranged in this way, it is possible to arrange the heat-flux sensor 40 directly on the pipe 10, so there is no need to arrange a heat-conducting member 70, which makes it possible to reduce the number of parts.

Third Embodiment

A third embodiment of the present invention will be explained. The present embodiment differs from the first embodiment in that the second temperature sensor 30 and the heat-flux sensor 40 are integrated into a single body, however, the other parts are the same as those of the first embodiment, so an explanation of those parts will be omitted here.

Figure 7:
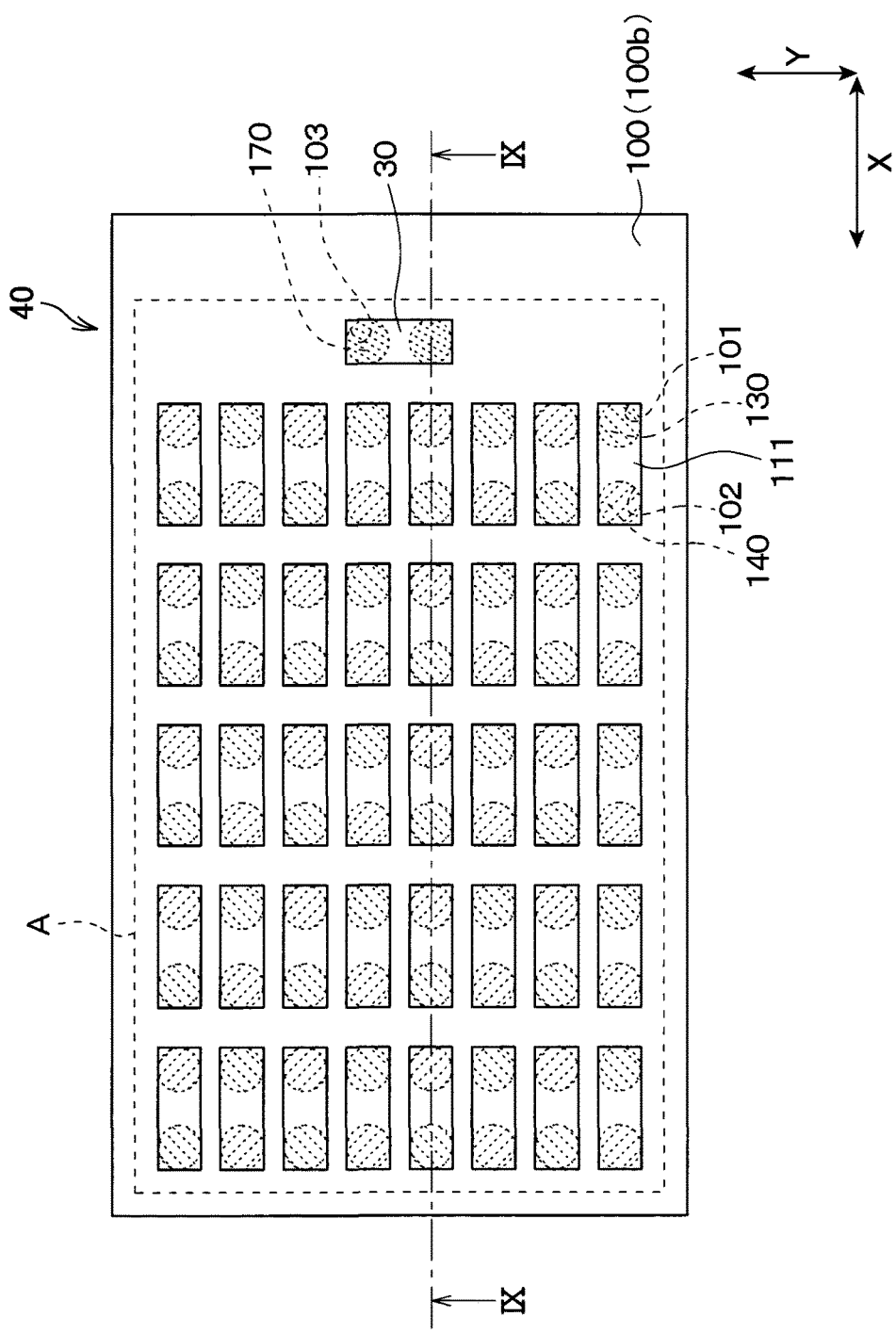
FIG. 7 is a plan view of a heat-flux sensor illustrated in FIG. 6 as seen from a rear-surface-protective-member side.
Figure 8:
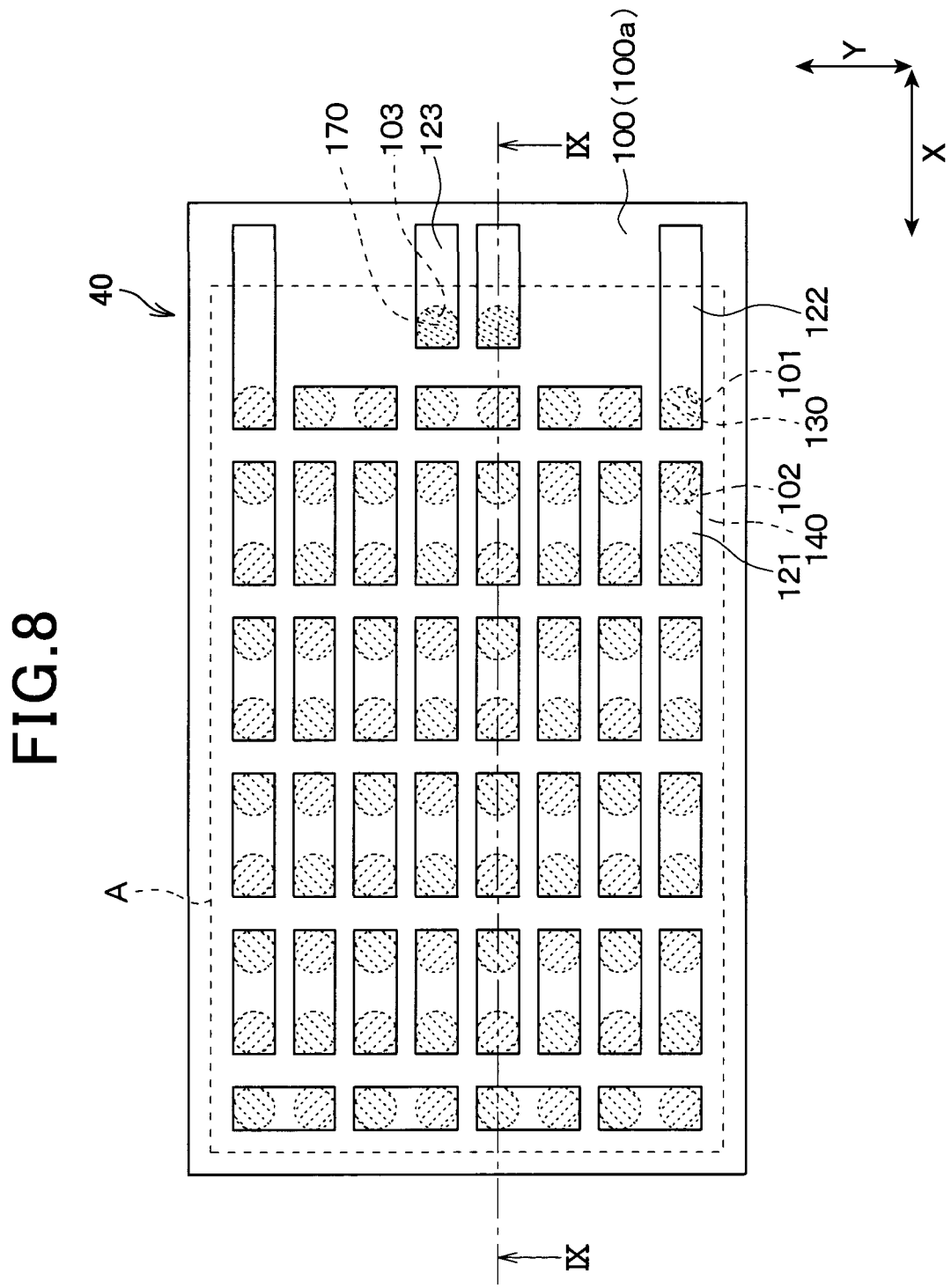
FIG. 8 is a plan view of the heat-flux sensor illustrated in FIG. 6 as seen from a front-surface-protective-member side.
Figure 9:
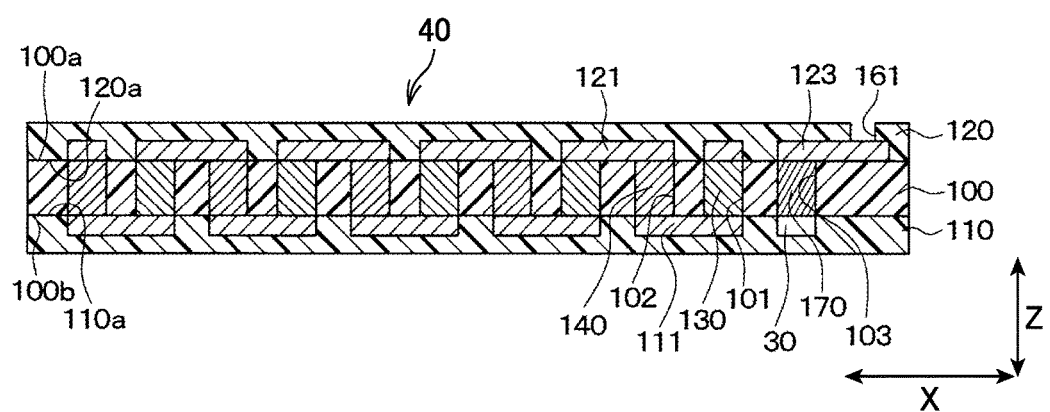
FIG. 9 is a cross-sectional view taken along a section line IX-IX in FIG. 7 and FIG. 8.

In the present embodiment, as illustrated in FIG. 7 to FIG. 9, the second temperature sensor 30 and the heat-flux sensor are integrated into a single body. More specifically, the second temperature sensor 30 is arranged between the insulating substrate 100 and the rear-surface-protective member 110, and is arranged so as to be inside the area A. In FIG. 7, in order to make it easier to understand, the rear-surface-protective member 110 is omitted. Moreover, in FIG. 8, in order to make it easier to understand, the front-surface-protective member 120 is omitted. FIG. 7 and FIG. 8 are not cross-sectional views, however, the first and second interlayer-connecting members 130, 140, and a third interlayer-connecting member 170 that will be described later are indicated by hatching.

Third via holes 103 that are similar to the first and second via holes 101, 102 are formed in the insulating member 100. A third interlayer-connecting member 170 that is a sintered metal and similar to the first and second interlayer-connecting members 130, 140 is arranged in the third via holes 103. The third via holes 103 are formed so as to expose the second temperature sensor 30, and the third interlayer-connecting member 170 is arranged so as to be electrically connected with the second temperature sensor 30.

Moreover, two connecting patterns 123 that are similar to the connecting patterns 122 are formed in the front-surface-protective member 120. The connecting patterns 123 are such that the end sections on the opposite side from the side that is connected to the third interlayer-connecting member 170 extend to the outside of the area A. As illustrated in FIG. 9, a connecting hole 161 that exposes end sections of the extended connecting patterns 123 similar to the connecting hole 160 is formed in the front-surface-protective member 120. In this way, the heat-flux sensor 40 can be electrically connected to the control unit 60 via the connecting hole 161. The configuration of the third interlayer-connecting member 170 may be the same as the configuration of the first and second interlayer-connecting members 130, 140, however, the third interlayer-connecting member 170 may be suitably changed as long as an electrical connection with the second temperature sensor 30 and connecting patterns 123 is possible.

It is not particularly illustrated in the figures, however, this kind of integrated second temperature sensor 30 and heat-flux sensor 40 are arranged directly on the outer-wall surface of the pipe 10 so that the front-surface-protective member 110 side of the heat-flux sensor 40 faces the outer-wall surface of the pipe 10.

According to this, the second temperature sensor 30 and the heat-flux sensor 40 are integrated into a single body. Therefore, when installing the second temperature sensor 30 and the heat-flux sensor 40 to the outer-wall surface of the pipe 10, it is possible to obtain the same effect as that of the first embodiment while suppressing the shifting of the positions of the second temperature sensor 30 and the heat-flux sensor 40 from occurring.

Fourth Embodiment

A fourth embodiment of the present invention will be explained. The present embodiment differs from the third embodiment in that the first temperature sensor 20 is also integrated with the heat-flux sensor 40 into a single body, however, the other parts are the same as those of the first embodiment, so an explanation of those parts will be omitted here.

Figure 10:
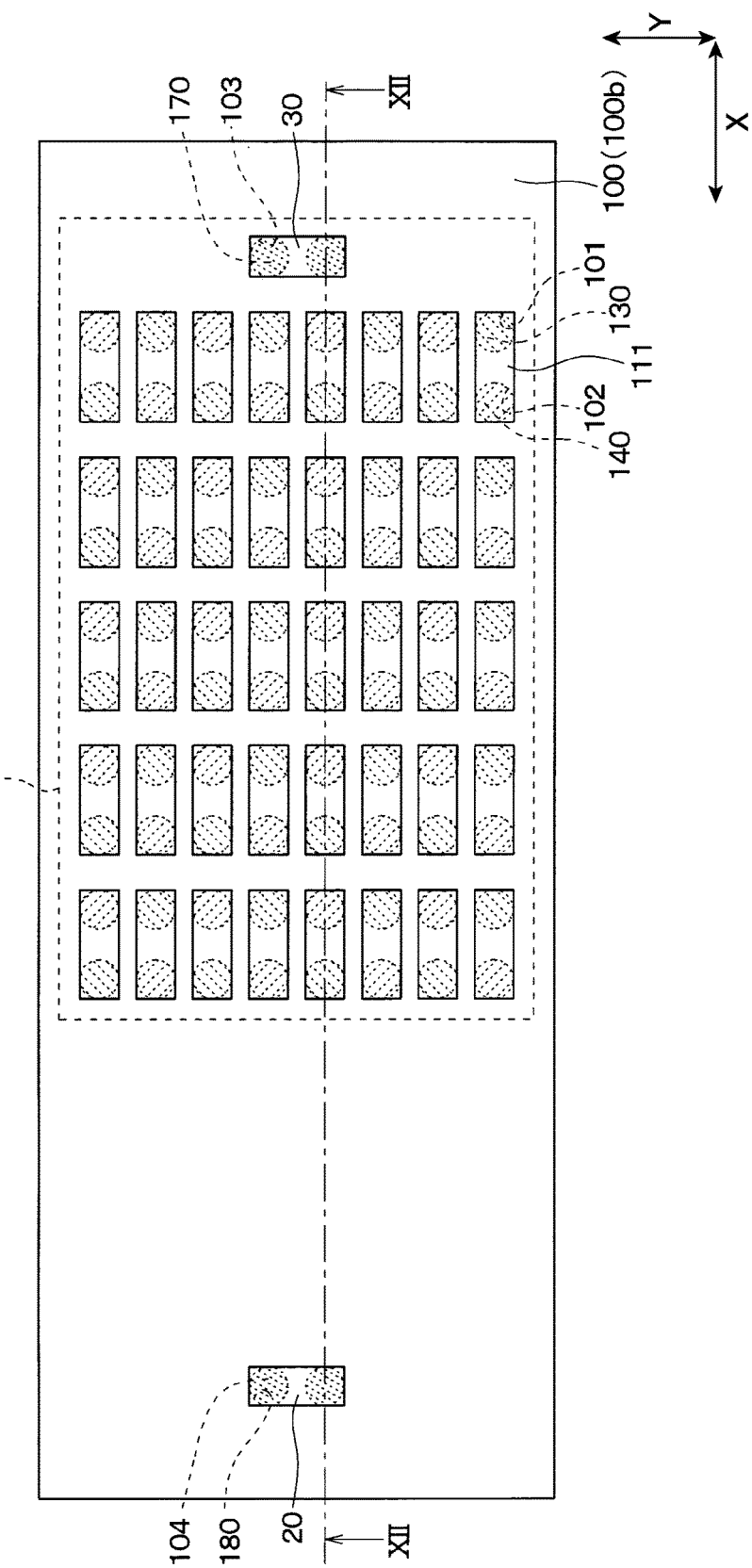
FIG. 10 is a plan view of a heat-flux sensor of a third embodiment of the present invention as seen from a rear-surface-protective-member side.
Figure 11:
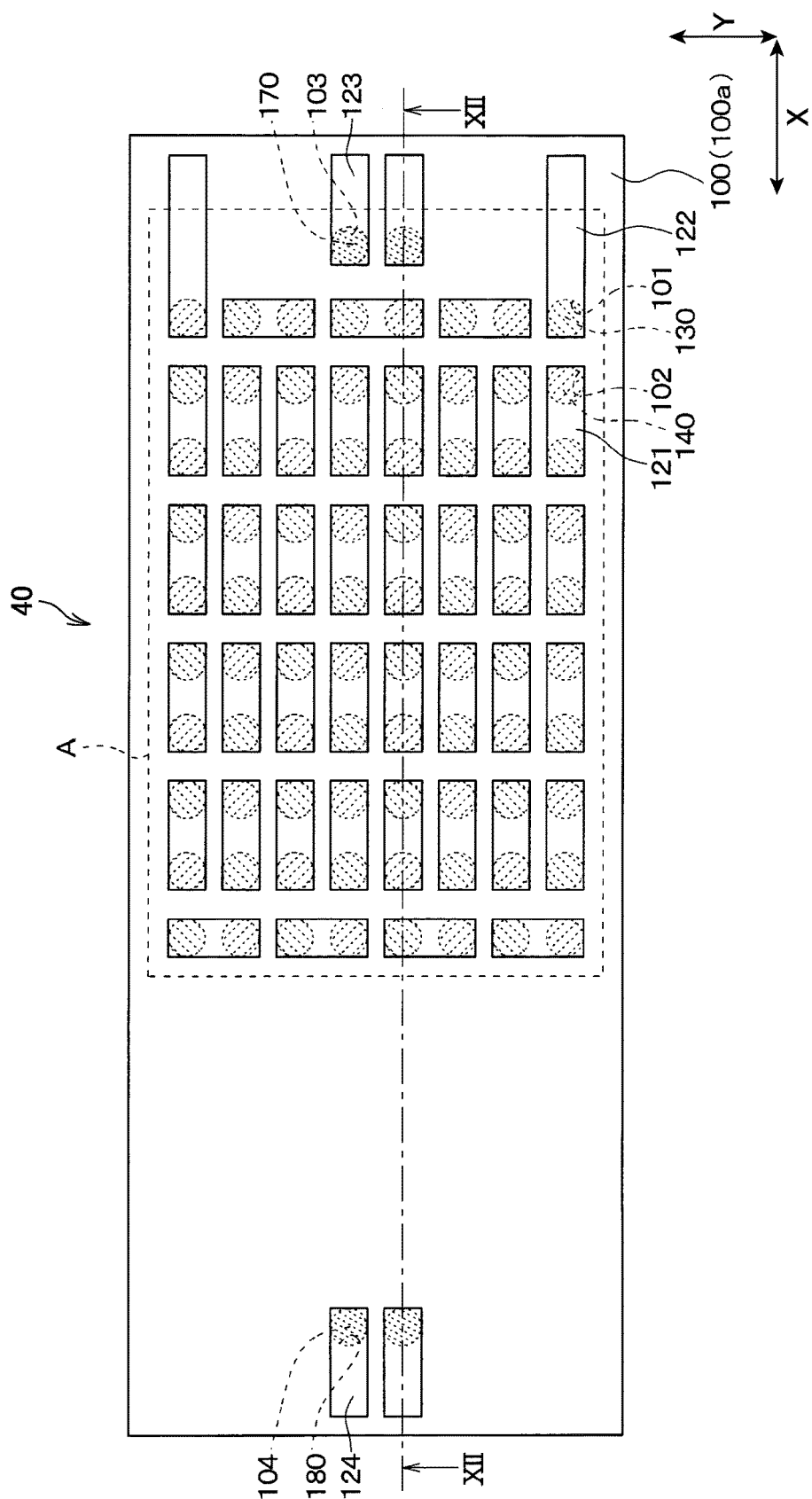
FIG. 11 is a plan view of the heat-flux sensor illustrated in FIG. 10 as seen from a front-surface-protective-member side.
Figure 12:
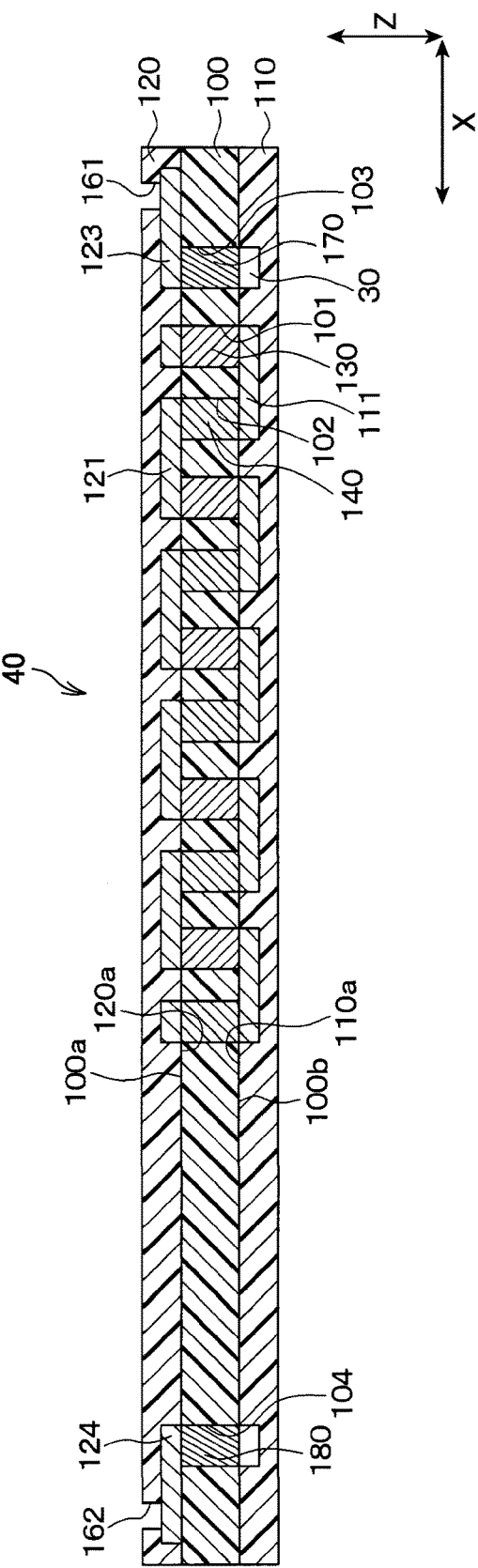
FIG. 12 is a cross-sectional view taken along a section line XII-XII in FIG. 10 and FIG. 11.

In the present embodiment, as illustrated in FIG. 10 to FIG. 12, the first temperature sensor 20, together with the second temperature sensor 30, is integrated with the heat-flux sensor 40. More specifically, the first temperature sensor 20 is arranged between the insulating member 100 and the rear-surface-protective member 110, and is arranged so as to be positioned on the outside of the area A.

In order the first temperature sensor 20 not to be affected by the heat-transfer element 50, the first temperature sensor 20 is arranged outside of the area A, and is arranged at a position that is sufficiently separated from area A. Moreover, in FIG. 10, in order to make it easier to understand, the rear-surface-protective member 110 is omitted. Furthermore, in FIG. 11, in order to make it easier to understand, the front-surface-protective member 120 is omitted. FIG. 10 and FIG. 11 are not cross-sectional views, however, the first to third interlayer-connecting members 130, 140, 170 and a fourth interlayer-connecting member 180 that will be described later are indicated by hatching.

A fourth via hole 104 that is similar to the first to third via holes 101 to 103 is formed in the insulating substrate 100. Fourth interlayer-connecting members 180 that are sintered metal and similar to the first to third interlayer-connecting members 130, 140, 170 are arranged in the fourth via hole 104. The fourth via hole 104 is formed so as to expose the first temperature sensor 20, and the fourth interlayer-connecting members 180 are arranged so as to be electrically connected with the first temperature sensor 20.

Moreover, two connecting patterns 124 that are similar to the connecting patterns 122, 123 are formed in the front-surface-protective member 120. The connecting patterns 124 are such that the end sections on the opposite side from the side where the fourth interlayer-connecting members 180 are connected extend to outside the area A. Connecting holes 162 that are similar to the connecting holes 160 and that expose the end sections of the extending connecting patterns 124 are formed in the front-surface-protective member 120. Electrical connection with the control unit 60 is possible via the connecting holes 162. The fourth interlayer-connecting-members 180 may have the same configuration as the first and second interlayer-connecting members 130, 140. However, the fourth interlayer-connecting members 180 can be suitably changed as long as electrical connection with the first temperature sensor 20 and connecting patterns 124 is possible.

It is not particularly illustrated in the figures, however, this kind of the integrated first temperature sensor 20, the second temperature sensor 30 and heat-flux sensor 40 are arranged in direct contact with the outer-wall surface of the pipe 10 so that the rear-surface-protective member 110 side of the heat-flux sensor faces the outer-wall surface of the pipe 10. In the present embodiment as well, the first temperature sensor 20 is arranged so as to be further on the upstream side in the direction of flow of the measurement medium than the second temperature sensor 30 is.

According to this, the first temperature sensor 20, the second temperature sensor 30 and the heat-flux sensor 40 are integrated into a single body. Therefore, when installing the first temperature sensor 20, the second temperature sensor 30, and heat-flux sensor 40 to the outer-wall surface of the pipe 10, the same effect as in the first embodiment described above can be obtained while preventing the occurrence of shifting of the positions of the first temperature sensor 20, the second temperature sensor 30, and heat-flux sensor 40.

Fifth Embodiment

A fifth embodiment of the present invention will be explained. The present embodiment differs from the first embodiment in that the heat-flux sensor 40 and heat-transfer element 50 are integrated into a single body, however, the other parts are the same as in the first embodiment, so an explanation of those parts is omitted.

Figure 13:
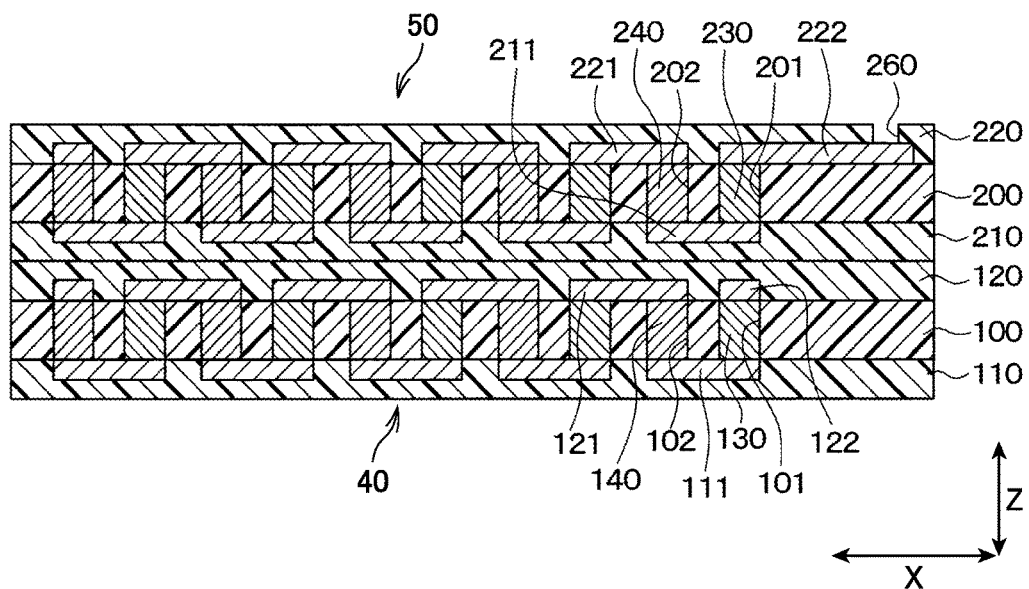
FIG. 13 is a cross-sectional view of a heat-transfer element and a heat-flux sensor of a fourth embodiment of the present invention.

In the present embodiment, as illustrated in FIG. 13, the heat-flux sensor 40 and heat-transfer element 50 are integrated into a single body. First, the configuration of the heat-transfer element 50 will be explained. The heat-transfer element 50 has an insulating substrate 200, a rear-surface-protective member 210, a rear-surface pattern 211, a front-surface-protective member 220, a front-surface pattern 221, connecting patterns 222, and first and second interlayer-connecting members 230, 240. The basic configuration of the heat-transfer element 50 is the same as the configuration of the heat-flux sensor 40 illustrated in FIG. 2 to FIG. 5. Moreover, connecting holes 260 that expose the connecting patterns 222 are formed in the front-surface-protective member 220.

This kind of heat-transfer element 50 is such that, by being energized from the control unit 60 via the connecting patterns 222, is heated from one surface side of the rear-surface-protective member 210 side and front-surface-protective member 220 side, and is cooled from the other surface side. In other words, the heat-transfer element 50 of the present embodiment utilizes the Peltier effect. This kind of heat-transfer element 50 is such that heating and cooling can be set by adjusting the energizing direction. Therefore, depending on the use, it is possible to change heating and cooling by adjusting the energizing direction. In other words, in the heat-transfer element 50 of the present embodiment, it is possible to heat or cool the outer-wall surface of the pipe 10 using a common element. The configuration of the heat-transfer element 50 of the present embodiment is as described above.

The heat-flux sensor 40 and the heat-transfer element 50 are integrated so that the front-surface-protective member 120 of the heat-flux sensor 40 faces the rear-surface-protective member 210 of the heat-transfer element 50. In other words, the heat-flux sensor 40 and the heat-transfer element 50 are formed on one common substrate that includes the rear-surface-protective member 110, the insulating substrate 100, the front-surface-protective member 120, the rear-surface-protective member 210, the insulating substrate 200, and the front surface-protective member 220.

The heat-flux sensor 40 in FIG. 13 corresponds to a cross section of a portion that differs from that in FIG. 4, and the heat-flux sensor 40 is such that in a different cross section than that illustrated in FIG. 13, the connecting patterns 122 are exposed by connecting holes (not illustrated in the figures) that are formed so as to penetrate through the heat-transfer element 50. Then, the heat-flux sensor 40 can be electrically connected with the control unit 60 via the connecting holes.

Moreover, in the present embodiment, the dimensions of the planar shape of the heat-flux sensor 40 and the dimensions of the planar shape of the heat-transfer element 50 are the same. However, even for the heat-flux sensor 40 and heat-transfer element 50 in such a state, when viewed from the layering direction (thickness direction Z) of the heat-flux sensor 40 and heat-transfer element 50, it can be said that the heat-transfer element 50 is positioned inside the heat-flux sensor 40.

This kind of heat-flux sensor 40 and heat-transfer element 50 are integrated and manufactured by forming a laminate by layering in order the rear-surface-protective member 110 of the heat-flux sensor 40, the insulating substrate 100, the front-surface-protective member 120, the rear-surface-protective member 210 of the heat-transfer element 50, the insulating substrate 200, and the front-surface-protective member 220, and then applying pressure while heating the laminate.

In this way, the heat-flux sensor 40 and heat-transfer element 50 are integrated into a single body. Therefore, when installing the heat-flux sensor 40 and heat-transfer element 50 on the pipe 10, it is possible to obtain the same effect as in the first embodiment while suppressing an occurrence of shifting of the position of the heat-flux sensor 40 and the heat-transfer element 50.

In the embodiment described above, configuration in which the front-surface-protective member 120 of the heat-flux sensor 40 and the rear-surface-protective member 210 of the heat-transfer element 50 are different members is explained, however, the front-surface-protective member 120 of the heat-flux sensor 40 and the rear-surface-protective member 210 may be used in common.

Sixth Embodiment

A sixth embodiment of the present invention is explained. The present embodiment differs from the first embodiment in that the arrangement location of the first temperature sensor 20 is changed, however, the other parts are the same as those in the first embodiment, so an explanation of those parts is omitted here.

Figure 14:
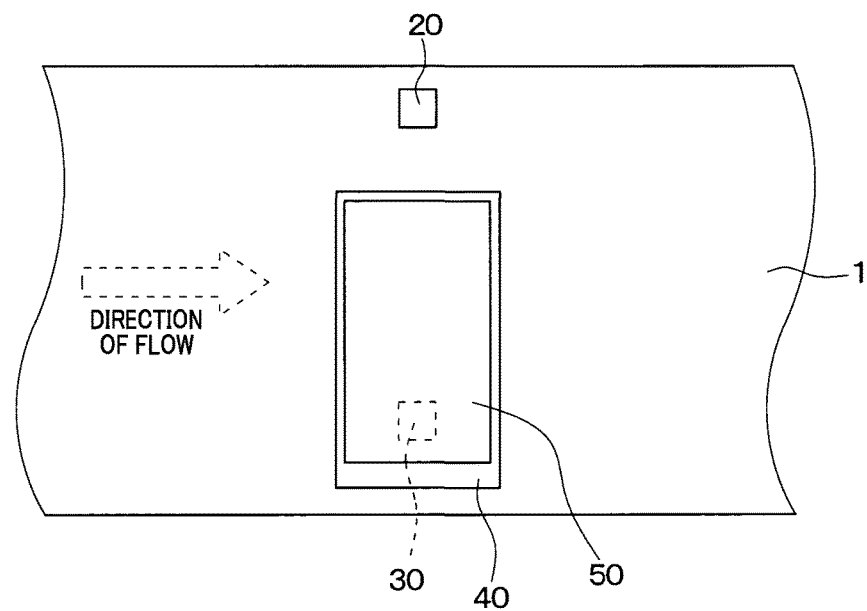
FIG. 14 is a schematic diagram illustrating an arrangement configuration of a thermal flow-rate sensor of a fifth embodiment of the present invention.

In the present embodiment, as illustrated in FIG. 14, the first temperature sensor 20 is arranged so as to be separated from the second temperature sensor 30 (heat-transfer element 50) in the circumferential direction of the pipe 10. FIG. 14 is a schematic plan view as seen from the outer-wall surface side of the pipe 10, and illustrates a state in which the insulating member 80 is omitted. Moreover, in the present embodiment, as in the first embodiment, the first temperature sensor 20 is arranged so as to be sufficiently separated from the second temperature sensor 30 (heat-transfer element 50) so that the temperature of the portion of the outer-wall surface of the pipe 10 that is not heated by the heat-transfer element 50 can be detected.

According to this, the first temperature sensor 20 is separated in the circumferential direction of the pipe 10 from the heat-transfer element 50. Therefore, when a ring-shaped insulating member 80 is arranged so as to cover the first temperature sensor 20, second temperature sensor 30, heat-flux sensor 40, heat-transfer element 50 and pipe 10 in the circumferential direction, it is possible to shorten the length of the insulating member 80 in the direction of flow of the measurement medium. As a result, it is possible to reduce the amount used for the entire insulating member 80.

Other Embodiments

The present invention is not limited to the embodiments described above, and can be suitably changed within the range described in the claims.

For example, in the embodiments described above, the configuration of the heat-flux sensor 40 is not limited to that described above, and, for example, configuration of the heat-flux sensor 40 may be such that a thermopile is used.

In the first to fourth, and sixth embodiments described above, the heat-transfer element 50 may cool the outer-wall surface of the pipe 10.

Furthermore, in the third embodiment the case was explained in which the second temperature sensor 30 is arranged between the insulating substrate 100 and the rear-surface-protective member 110, however, the second temperature sensor 30 may also be integrated with the heat-flux sensor 40. For example, the second temperature sensor 30 may be integrated with the heat-flux sensor 40 by arranging the second temperature sensor 30 on the opposite side of the rear-surface-protective member 110 from the insulating substrate 100 side. Similarly, in the fourth embodiment described above, the case was explained in which the first temperature sensor 20 is arranged between the insulating substrate 100 and the rear-side-protective member 110, however, the first temperature sensor 20 may be integrated with the heat-flux sensor 40. For example, the first temperature sensor 20 may be integrated with the heat-flux sensor 40 by arranging the first temperature sensor 20 on the opposite side of the rear-surface-protective member 110 from the insulating substrate 100 side.

Moreover, in the fourth embodiment, it is possible to integrate only the first temperature sensor 20 and the heat-flux sensor 40, and the second temperature sensor 20 does not need to be integrated with the heat-flux sensor 40.

Furthermore, it is possible to suitably combine the embodiments described above. For example, the second embodiment may be combined with the third and fourth embodiments, so that the second temperature sensor 30 is arranged outside of the area A. Similarly, the second embodiment may be combined with the fifth and sixth embodiments so that the second temperature sensor 30 is arranged near the portion of the outer-wall surface of the pipe 10 that faces the heat-transfer element 50. Moreover, the third and fourth embodiments may be combined with the sixth embodiment so that the heat-flux sensor 40, first temperature sensor 20 and second temperature sensor 30 are suitably integrated. The fifth embodiment may be combined with the sixth embodiment so that the heat-flux sensor 40 and the heat-transfer element 50 are integrated. Furthermore, the combinations of embodiments described above may also be combined with each other.

DESCRIPTION OF REFERENCE NUMBERS

10 Pipe
11 Passageway
20 First temperature sensor
30 Second temperature sensor
40 Heat-flux sensor
50 Heat-transfer element
60 Control unit

What is claimed is:

1. A thermal flow-rate sensor, comprising:
a first temperature sensor that detects the temperature of a measurement medium that is flowing through a passageway inside a pipe by detecting the temperature at a specified location of an outer-wall surface of the pipe;
a heat-transfer element that is arranged on the outer-wall surface of the pipe in a state separated from the first temperature sensor, and that exchanges heat with the measurement medium by heating or cooling the outer-wall surface of the pipe;

a second temperature sensor that detects the temperature of a portion of the outer-wall surface of the pipe that is heated or cooled by the heat-transfer element; and a control unit that performs specified processing; wherein a heat-flux sensor is arranged between the heat-transfer element and the outer-wall surface of the pipe and detects heat flux between the heat-transfer element and the pipe;

the control unit detects a flow rate of the measurement medium based on the temperature that is detected by the first temperature sensor, the temperature that is detected by the second temperature sensor, and the heat flux that is detected by the heat-flux sensor; and the heat-flux sensor is configured such that a plurality of first and second via holes that penetrate in a thickness direction being formed in an insulating substrate that is composed of a thermoplastic resin, first and second interlayer-connecting members formed of metals that are different from each other are embedded in the first and second via holes, a front-surface pattern being formed on a front surface of the insulating substrate, a rear-surface pattern being formed on a rear surface of an opposite side from the front surface, and the first and second interlayer-connecting members are alternately connected in series via the front-surface pattern and the rear-surface pattern.

2. The thermal flow-rate sensor according to claim 1, wherein when viewed in a layering direction of the heat-flux sensor and the heat-transfer element, the heat-transfer element is positioned inside the heat-flux sensor.

3. The thermal flow-rate sensor according to claim 1, wherein the second temperature sensor is integrated into a single body with the heat-flux sensor.

4. The thermal flow-rate sensor according to claim 1, wherein the first temperature sensor is integrated into a single body with the heat-flux sensor.

5. The thermal flow-rate sensor according to claim 1, wherein the heat-transfer element is configured so that a plurality of first and second via holes that penetrate in a thickness direction being formed in an insulating substrate composed of a thermoplastic resin, first and second interlayer-connecting members formed using metal that is different from each other are embedded in the first and second via holes, a front-surface pattern being formed in a front surface of the insulating substrate, a rear-surface pattern being formed in a rear surface on an opposite side from the front surface, and the first and second interlayer-connecting members are alternately connected in series via the front-surface pattern and the rear-surface pattern, and the heat-transfer element is integrated into a single body with the heat-flux sensor.

6. The thermal flow-rate sensor according to claim 1, wherein the first temperature sensor is arranged so as to be separated from the heat-transfer element in a circumferential direction of the pipe.

* * * * *